United States Patent [19]

Prange et al.

[11] Patent Number: 5,246,310

[45] Date of Patent: Sep. 21, 1993

[54] PROCESS FOR PRODUCING A LANDFILL

[75] Inventors: William A. Prange, Tonawanda; Brent E. Minet, Grand Island, both of N.Y.

[73] Assignee: Steve Washuta, Lewiston, N.Y.

[21] Appl. No.: 914,786

[22] Filed: Jul. 16, 1992

[51] Int. Cl.$^5$ .............................................. B09B 1/00
[52] U.S. Cl. ................................... 405/129; 405/128
[58] Field of Search ............... 405/128, 129, 258, 263; 241/DIG. 31, DIG. 38; 588/249

[56] References Cited

U.S. PATENT DOCUMENTS 4,757,949  7/1988  Horton ................ 241/DIG. 31 X
4,834,300  5/1989  Wojciechowski et al. .... 405/129 X
5,026,208  6/1991  Beyer et al. ......................... 405/129

Primary Examiner—David H. Corbin
Attorney, Agent, or Firm—Howard J. Greenwald

[57] ABSTRACT

A process for producing a landfill from a specified landfill site is disclosed.

In the first step of this process, leachate from the landfill site is collected. Thereafter a specified shredded material is contacted with the leachate to age it, the horizontal permeability of the aged shredded material is then tested with a specified permeability tester; if the test is successful, the shredded material is used in the landfill and covered with waste material.

11 Claims, 9 Drawing Sheets

PROCESS FOR PRODUCING A LANDFILL

FIELD OF THE INVENTION

A process for producing a landfill in which shredded elastomeric tire material is used. In this process, the shredded tire material is tested to determine its permeability under simulated conditions of use.

BACKGROUND OF THE INVENTION

Worn automotive tires present a major disposal problem; and many solutions have been advanced for the disposal of such tires. Thus, the use of such tires in animal running surfaces (U.S. Pat. No. 5,020,936), the building of houses (U.S. Pat. No. 5,088,253), and in decomposition processes (U.S. Pat. No. 4,895,083) has been suggested. The disclosure of each of these United States patents is hereby incorporated by reference into this specification.

One of the most practical alternatives for the disposal of old tires is to use them in sanitary landfills as a drainage medium. Relatively large volumes of the tires may be used in this application (upwards of 1,000,000 tires per acre), and relatively little processing is required to prepare the tires for such use.

Sanitary landfills must be designed in compliance with State and Federal regulations. In New York State, the required design consists of alternating layers of low permeability soil and geomembranes with drainage layers of sand, stone, or geosynthetics to allow leachate to flow to sumps for removal and treatment. Immediately beneath the refuse a primary drainage blanket, which usually consists of 24 inches of stone, is required.

It would be desirable to be able to replace at least a portion of the layer of stone with tire chips. The stone is relatively expensive, and landfill operators are often paid to dispose of tires.

The extent to which the tire chips will adequately function in the landfill depends upon several factors, including the nature of the wastes deposited in the landfill. A layer of tire chips which might be suitable in one application might be unsuitable in another. Furthermore, even though one type of tire chips might be suitable in a particular application, another type might not.

It is an object of this invention to provide a process for determining the suitability of any tire chip material for a particular landfill.

It is another object of this invention to provide a process for producing a landfill using a particular landfill site and tire chip material.

It is yet another object of this invention to provide an device for testing a particular tire chip material to determine its suitability for use in a landfill.

SUMMARY OF THE INVENTION

In accordance with this invention, there is provided a process in tire chips are tested to determine their permeability under conditions of anticipated use. Thereafter, a landfill is constructed using the tire chips as a drainage layer, and waste material is then deposited over the tire chips.

BRIEF DESCRIPTION OF THE DRAWINGS

The invention will be described by reference to the following drawings, wherein like numerals refer to like elements, and wherein.

DESCRIPTION OF THE PREFERRED EMBODIMENTS

Sanitary landfills are regulated by both State and Federal authorities. One of the primary concerns of these authorities is that the landfill design be environmentally safe and that no contaminants from the landfill extend beyond the boundaries of the landfill.

One may only operate a landfill after the design of it has been approved by at least one governmental regulatory agency. Even when the landfill design is conventional, such approval is often difficult and time-consuming to obtain.

When a novel landfill design is proposed, obtaining approval for it often becomes exceedingly difficult. The regulatory agencies require a substantial amount of credible proof that such design will be environmentally safe.

Figure 1:
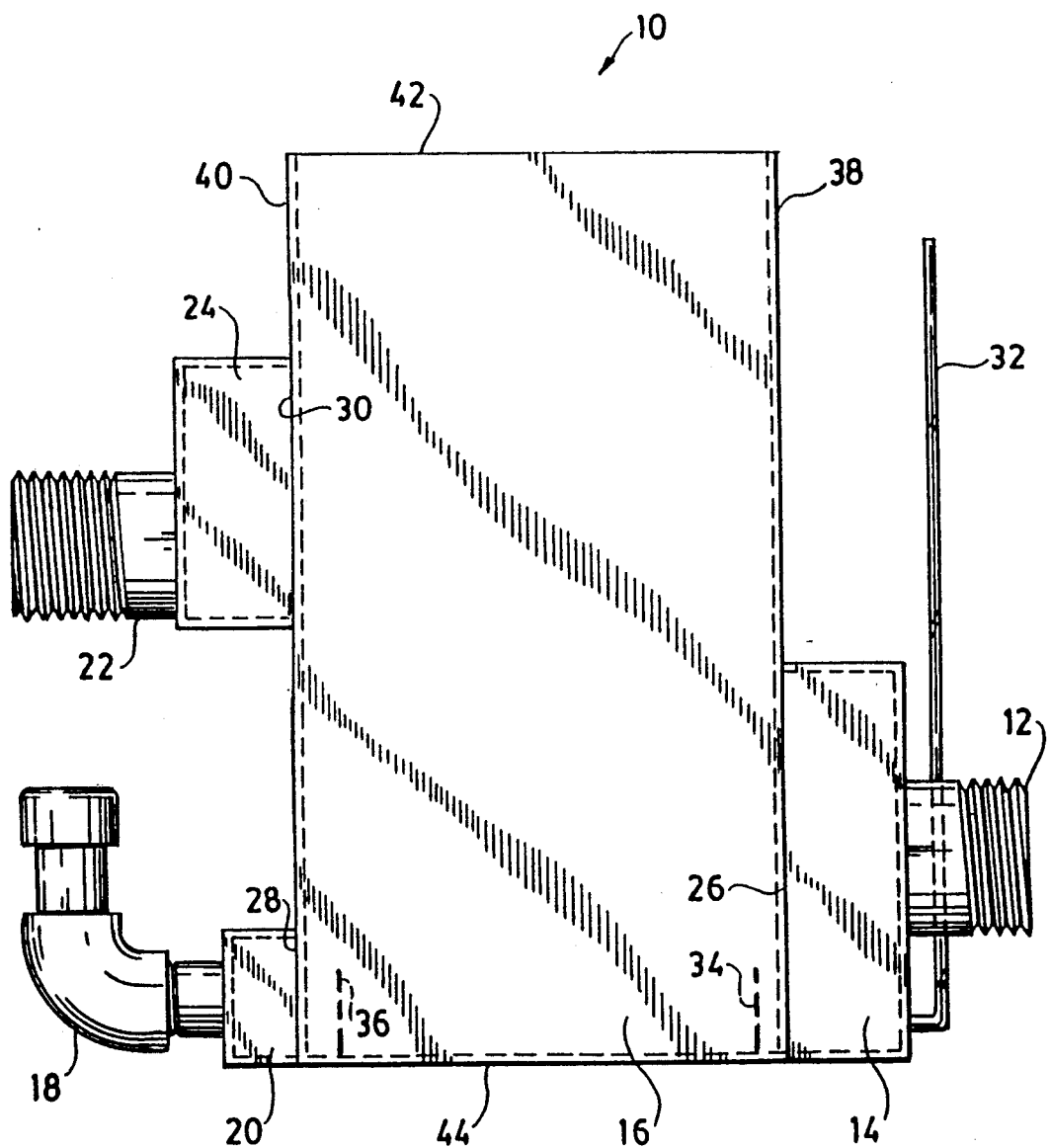
FIG. 1 is a side view of a preferred device for determining the permeability of tire chip material.

The device illustrated in FIG. 1 is designed to provide such credible proof. In particular, it is designed to demonstrate whether the tire material in a landfill will provide an environmentally safe drainage layer.

The landfill must contain materials which are permeable to the flow of fluid flowing through the landfill ("leachate"). If one or more portions of the landfill contain impermeable material, the leachate cannot flow through such material. If the leachate cannot readily flow, its hydraulic pressure will build up and tend to escape through the sides of the landfill. Furthermore, a build up of the leachate within the landfill often will cause a substantial amount of pressure to be exerted upon landfill components, such as liners, threatening their integrity.

FIG. 1 is a side view of a tire chip cell 10 which may be used in applicants' process. The function of cell 10 is to have the tire chips (not shown) in a confined space so that the volume of tire chips can be determined under varying pressure conditions.

The tire chips used in applicants' process, and in tire chip cell 10, are preferably produced by shredding motor vehicle tires. Most of these tires contain an elastomeric material (such as rubber, synthetic rubber, or elastomeric material), a synthetic material (such as nylon fiber, fiberglass, polyester fiber), often a metallic material (such as steel belts and/or steel beads). These tires are well known to those skilled in the art and are described, e.g., in U.S. Pat. Nos. 5,088,253, 5,020,936, 4,967,626, 5,895,083, 5,060,584, 5,048,764, 5,020,936, 5,014,462, 4,932,157, 4,684,070, 4,402,791, and 4,401,513. The disclosure of each of these United States patents is hereby incorporated by reference into this specification.

Referring again to FIG. 1, the tire chips are loaded into tire chip cell 10. It will be seen that tire chip cell 10 is comprised of water inlet 12, flow equalization chamber 14, tire chip chamber 16, lower water outlet 18, lower flow equalization chamber 20, upper water outlet 22, and upper flow equalization chamber 24.

In the preferred embodiment illustrated, water inlet 12 is preferably a four-inch threaded pipe which is connected to a source (not shown) of water; upper water outlet 22 also preferably is a four-inch threaded pipe. Water inlet 12 communicates with flow equalization chamber 14.

Flow equalization chamber 14 has several openings in face 26 (not shown in FIG. 1) which tend to equalize the rate at which water flows into the tire chip chamber 16. Similar openings (not shown) appear in faces 28 and 30 of flow equalization chambers 20 and 24, respectively, to equalize the water flow into water outlets 18 and 22.

Water inflow tube 32 operatively connected to flow equalization chamber 14. Inflow tube 32 preferably consists essentially of transparent material; and it will tend to indicate the amount of water within both equalization chamber 14 and tire chip cell 16.

Chip cell 16 is defined by walls 38, 40, 42, 44, and 46 which, preferably, are about 0.25 inches thick and consist essentially of stainless or other substantially inert structural material.

Referring again to FIG. 1, it will be seen that screens 34 and 36 are substantially aligned with the openings (not shown) in faces 26 and 28 of equalization chambers 14 and 20; and these screens tend to prevent the tire chips (not shown) from entering either equalization chamber 14 or equalization chamber 20. Screens 34 and 36, which are removably connected to walls 38 and 40, are used when the horizontal permeability of the tire chip bed is evaluated; one or both of these screens may be removed when the vertical permeability of the tire chips is evaluated.

Figure 2:
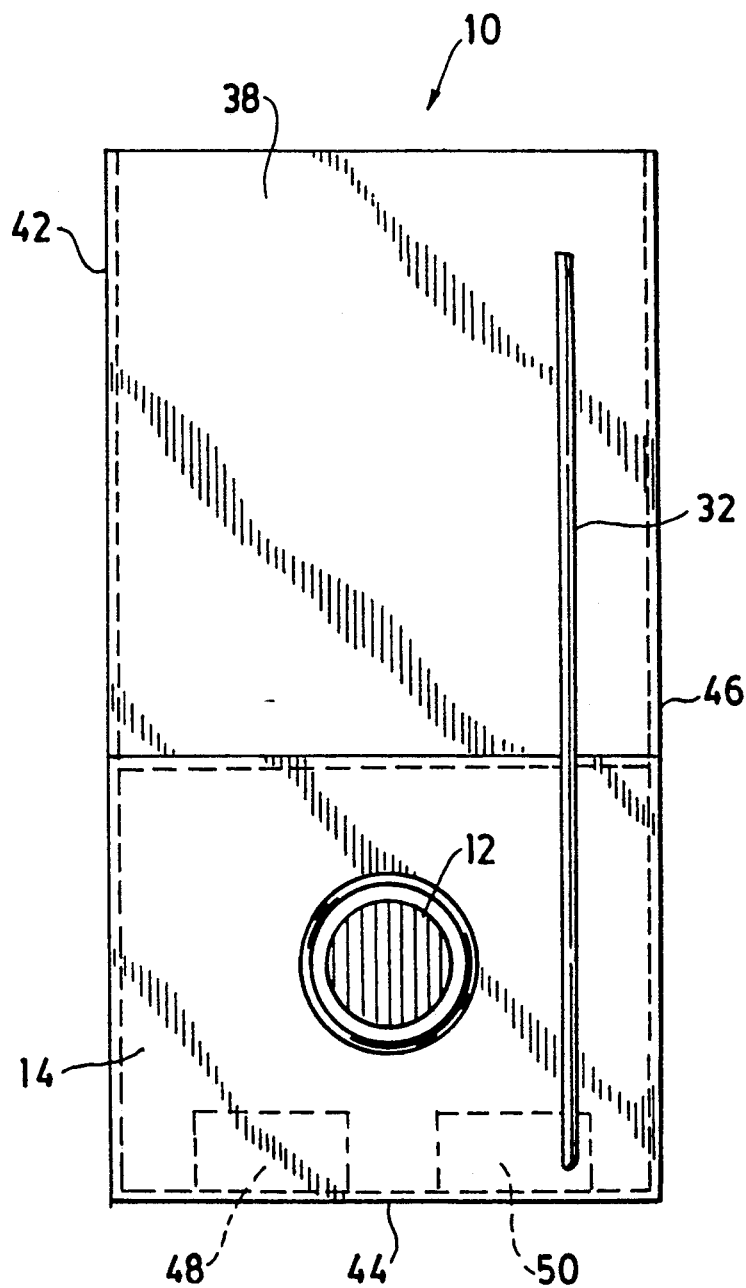
FIG. 2 is a front view of the device of FIG. 1.

FIG. 2 is a front view of the tire chip cell of FIG. 1. Referring to FIG. 2, it will be seen that water (not shown) will pass through water inlet 12, into equalization chamber 14, and then through openings 48 and 50 which are aligned with screen 34.

In one preferred embodiment, illustrated in FIG. 2, each of openings 48 50 and have a substantially rectangular shape and are about 1.75 inches by about 3.5 inches. The flow equalization chamber 14 preferably has an internal height of about 10 inches, an internal depth of about 3 inches, and an internal width of about 12 inches. The tire chip cell 10 preferably has an internal height of about 24 inches and an internal width of about 12 inches and a depth of about 12 inches.

Figure 3:
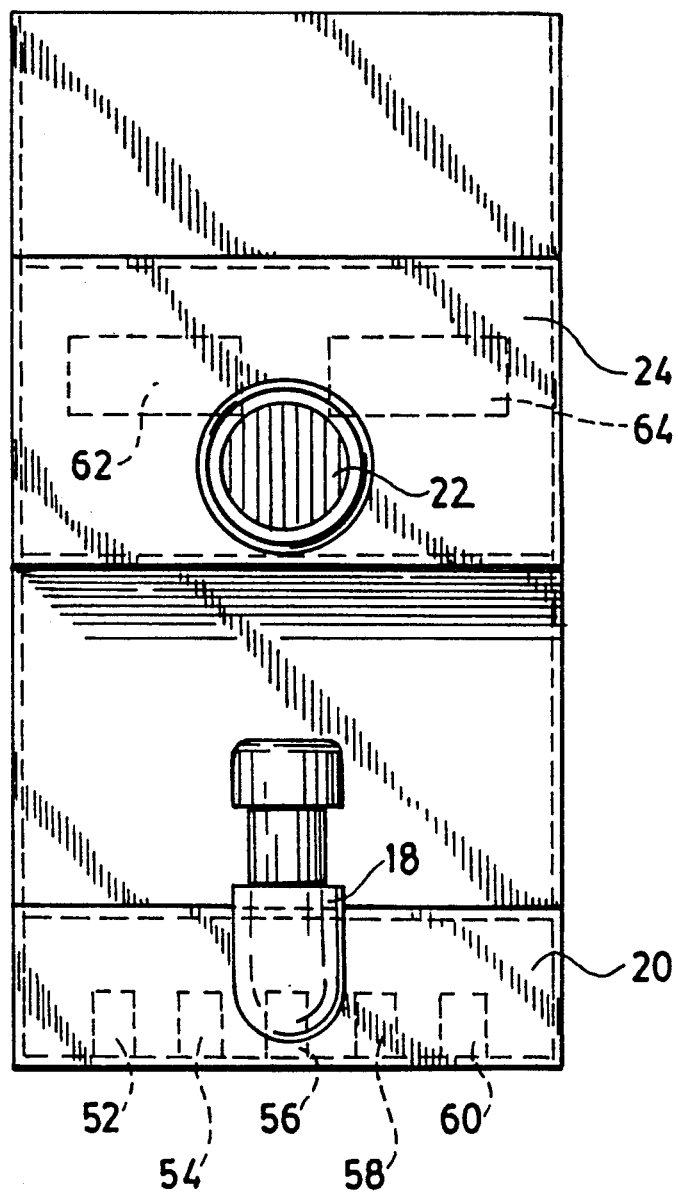
FIG. 3 is a rear view of the device of FIG. 1.

FIG. 3 is a rear view of the device of FIG. 1. Referring to FIG. 3, it will be seen that lower flow equalization chamber 20 is comprised of a multiplicity of openings 52, 54, 56, 58, and 60 which communicate with the interior of tire chip cell chamber 16 and allow water to flow from said chamber 16. As will be apparent to those skilled in the art, these openings 54, 56, 58, and 60 are formed in the face 28 of chamber 20 (see FIG. 1). In the embodiment illustrated, openings 52, 54, 56, 58, and 60 are preferably about 1 inch wide by about 1.5 inches high.

Referring again to FIG. 1, it will also be seen that upper flow equalization chamber 24 also is comprised of two openings 62 and 64 which are formed in the face 30 of chamber 24 (see FIG. 1) and which allow water to flow from chamber 16 to water outlet 22. In the embodiment illustrated, openings 62 and 64 are preferably rectangular in shape with a width of about 4.0 inches and a height of about 2.0 inches.

In the preferred embodiment illustrated, lower equalization chamber 20 preferably has an internal width of about 12 inches, a internal depth of about 1.75 inches, and an internal height of about 3.0 inches. The upper flow equalization chamber 24 preferably has an internal width of 12 inches, an internal depth of about 2.75 inches, and an internal height of about 7 inches.

Figure 4:
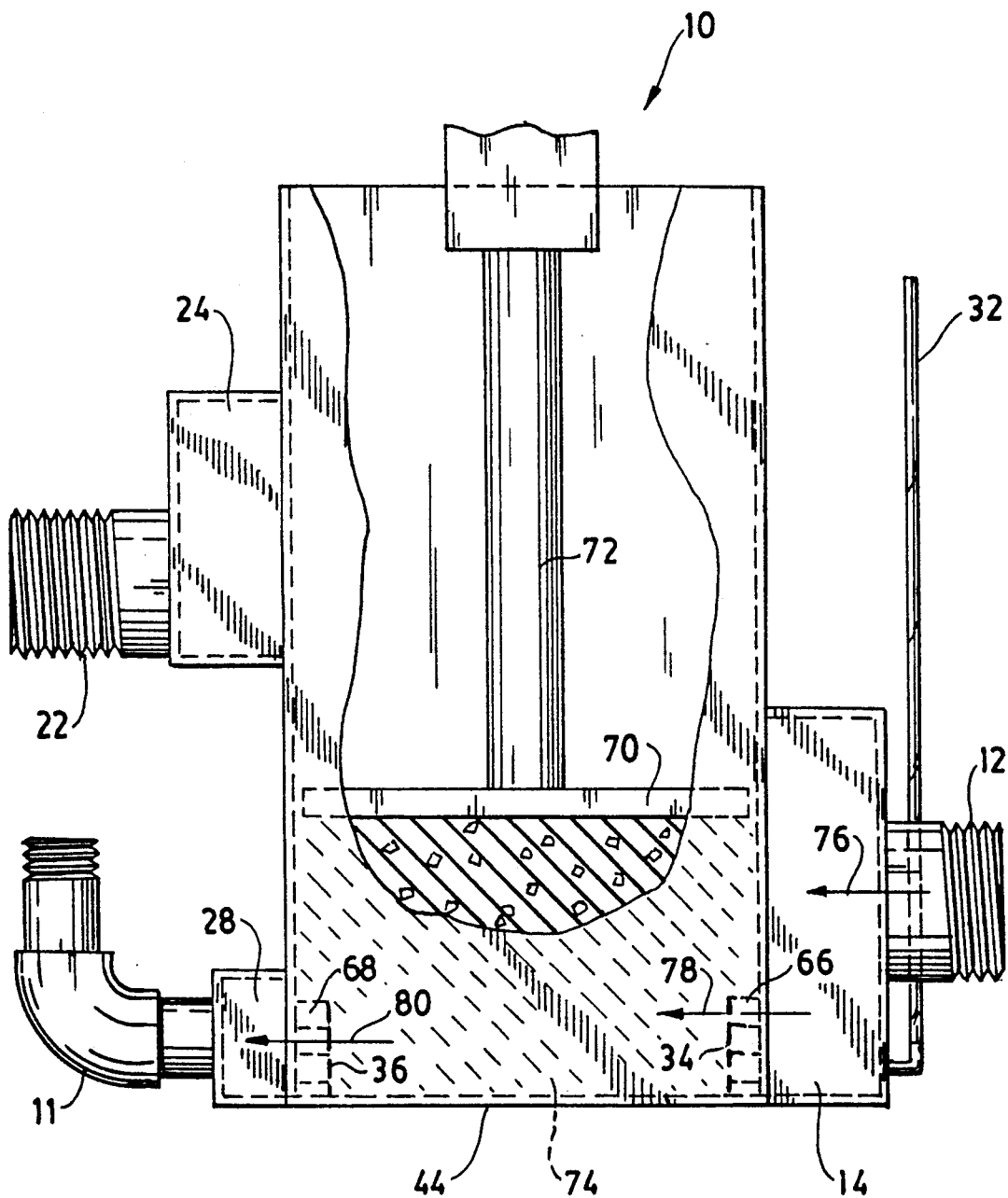
FIG. 4 is a side view of the device of FIG. 1 showing it operatively connected to a hydraulic press and loaded with tire chips.

FIG. 4 is a sectional view of the device of FIG. 1 illustrating tire chips therein being compressed by a compression means.

Referring to FIG. 4, it will be seen that tire chips are loaded into chamber 16 in the area depicted by the hatching. In the particular embodiment depicted, it is preferred that the tire chips have an nominal size of about 2.0 inches.

Screens 34 and 36 prevent the tire chips from passing either to flow equalization chamber 14 or flow equalization chamber 28. Means (not shown) are provided for attaching these screens to sidewall 42 in such a manner that they are contiguous with either horizontally-extending tab 66 or horizontally-extending tab 68.

Plate 70, which may be a steel plate (see FIG. 9), is used to compress the tire chips. In general, one may apply substantially the same compressive force upon the tire chips as they would experience in the landfill. The means of calculating the compressive force which the waste material will expert upon the tire chips are well known to those skilled in the art. Each type of waste which have a certain weight per cubic yard, depending upon the degree to which it has been compacted, its moisture level, and other factors. The weight of the refuse per cubic foot times the anticipated height of the material within the landfill will be substantially equal to the force which the refuse will exert upon the tire chip drainage layer.

Referring again to FIG. 4, it will be seen that the 0.75 inch thick steel plate 70 is contiguous with a means for applying compressive force 72 (such as a hydraulic cylinder) which, preferably, contains means for varying the amount of force applied; means 72 may be, e.g., a 100-ton hydraulic press. The device 10 also is comprised of a means for indicating the amount of pressure applied (not shown).

In the embodiment illustrated in FIG. 4, the permeability of the bed 74 of tire chips is tested in the horizontal direction, with water flowing in the directions of arrows 76, 78, and 80. In the embodiment illustrated in FIG. 5, the permeability of the tire chip bed 74 is tested in the vertical direction.

Figure 5:
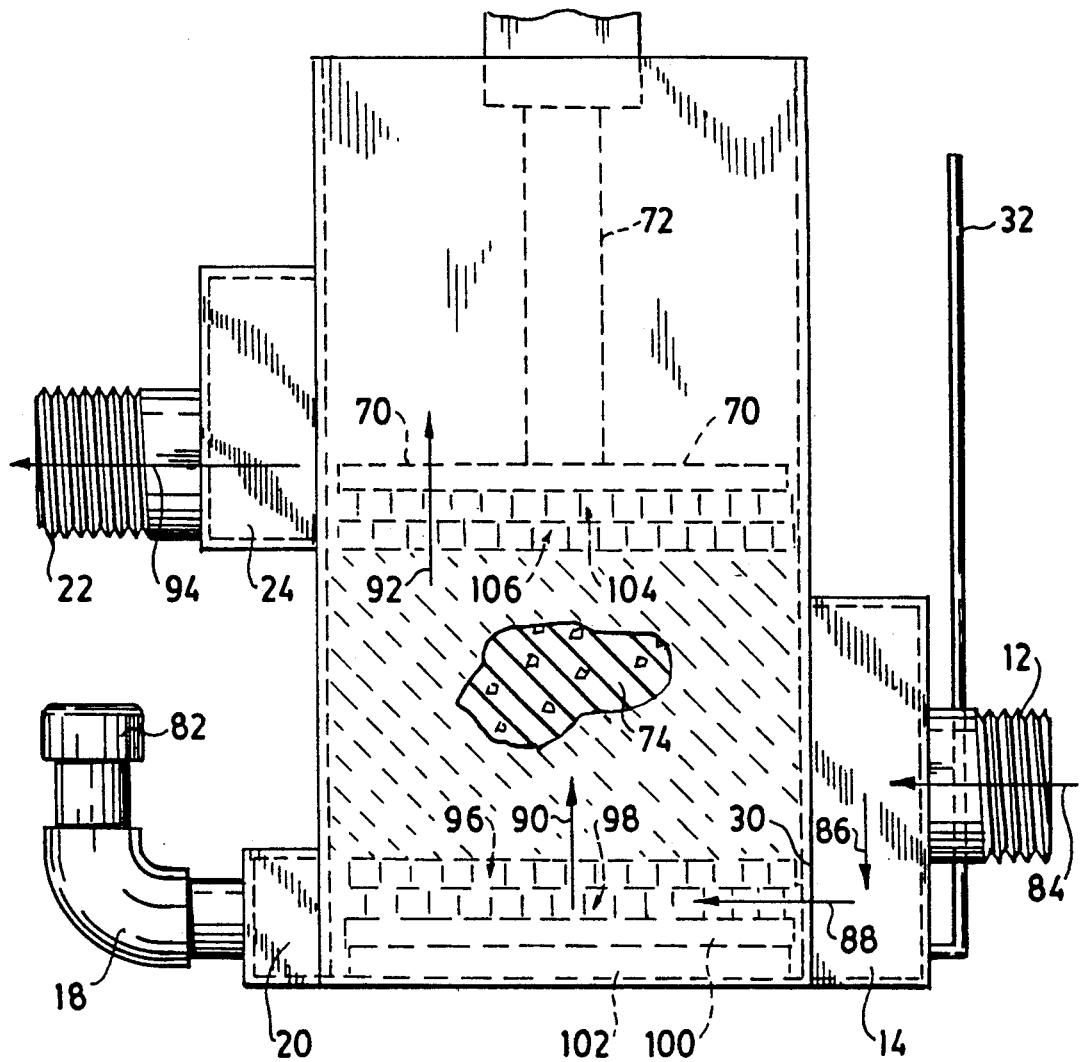
FIG. 5 is a side view of the device of FIG. 4.

Referring to FIG. 5, it will be seen that lower water outlet 18 is provided with means for preventing the flow of water from outlet 18 such as, e.g., cap 82. The device of this FIG. 5 allows water to flow in the directions of arrows 84, 86, 88, 90, 92, and 94. Thus, this configuration can be used to test the vertical permeability of the tire chip bed 74.

Referring again to FIG. 5, it will be seen that, after the water flows through inlet 12, it passes in the directions of arrows 86, 88, and 90 through openings (not shown) in face 30. This water then preferably is allowed to contact screens 96 and 98.

The screens 96 and 98 are supported on steel plate 100 which, in turn, is supported by spacer bar assembly 102.

In one preferred embodiment, the spacer bar assembly is comprised of a multiplicity of spacer bars such as, e.g., 3 bars each of which is 0.75 inches×0.75 inches×11 inches. These spacer bars are spaced across bottom wall 44; and the spacer bar assembly thereby provides spaces (not shown) for the water entering the tire chip chamber 16 to travel.

On top of the spacer bar assembly is supported a steel plate 100, which preferably has a thickness of about 0.75 inches, a length of about 11.5 inches, and width of about 11.5 inches. In one preferred embodiment, the steel plate has a 1 inch×1 inch notch in each of its corners to clear tabs (not shown) for screens 34 and 36.

Supported on and contiguous with steel plate 100 is screen 98. Screen 98 is part of a composite structure comprised of an upper screen and a lower screen; screen 96 is the upper screen, and screen 98 is the lower screen. The two screens are preferably contiguous with each other. The upper screen preferably has a rectangular shape with dimensions of about 11.5 inches by 10 inches by 0.75 inches; the wire mesh of the screen is about 0.375 inches; and the openings in such screen are about 0.75 inches maximum. The lower screen is substantially identical to the upper screen except for the diamond shape of its mesh pattern.

Referring again to FIG. 5, it will be seen that another set of screens are disposed beneath steel plate; they may be supported in place by conventional means as, for example, by resting on tire chip bed 74.

In one preferred embodiment, upper screen 104 and lower screen 106 have different sizes than upper screen 96 and lower screen 98. The latter screens are substantially rectangular; the former screens are substantially square. Thus, both upper screen 104 and lower screen 106 preferably have a length of 11.5 inches, a width of 11.5 inches, a mesh of 0.375 inches, a screen opening of about 0.75 inches, and a thickness of about 0.75 inches.

It is preferred that upper screen 104 have substantially the same screen opening shape as lower screen 98; and it also is preferred that lower screen 106 have substantially the same screen opening shape as upper screen 96. With the exception of the screen opening shape, upper screen 104 and lower screen 106 are substantially identical.

Figure 6:
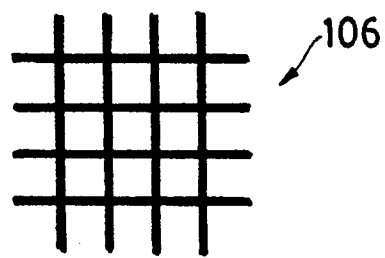
FIGS. 6, 7, and 8 are top views of screens which may be used in the device of FIG. 4.

FIG. 6 illustrates a preferred embodiment of screen 106; this screen preferably has 0.75 inch openings and uses 0.375 inch wire. It preferably has width and a height of 11.5 inches. As will be apparent to those skilled in the art, if its width is changed to about 10 inches, then it can be used as screen 96.

Figure 7:
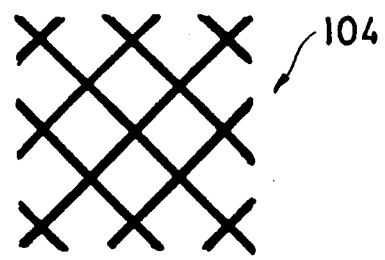

FIG. 7 illustrates a preferred embodiment of screen 104; this screen preferably has 0.75 inch openings and uses 0.375 inch wire. It preferably has width and a height of 11.5 inches. As will be apparent to those skilled in the art, if its width is changed to about 10 inches, then it can be used as screen 98.

Figure 8:
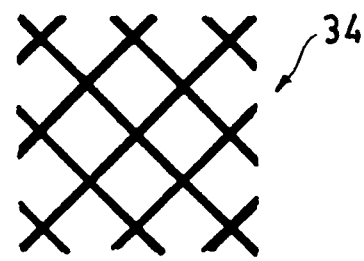

FIG. 8 illustrates a preferred embodiment of screen 34, which may be used in the structure of FIG. 4. It is preferred to use substantially the same structure for screen 36. Screen 34, and screen 36, preferably has a width of about 11.5 inches, a height of about 3.0 inches, a thickness of about 0.75 inches, a wire diameter of about 0.375 inches, and a screen opening size of 0.75 inches. Although one screen opening shape and size is illustrated, it will be apparent to those skilled in the art that other such shapes also may be used.

In one embodiment, not shown, a plate with holes passing through it is used instead of screen 34 and/or screen 36 to prevent the passage of tire chips through it.

Figure 9:
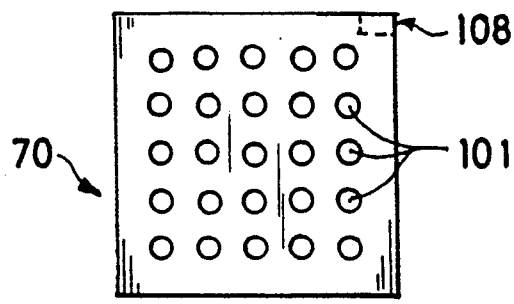
FIG. 9 is a steel plate which may be used in the device of FIG. 4.

FIG. 9 illustrates a perforated steel plate which, with modification, may be used as either plate 70 (see FIG. 4) and/or plate 100 (see FIG. 5). Referring to FIG. 9, plate 70 preferably has a thickness of 0.75 inches, a width of 11.5 inches, and a height of 11.5 inches. It also preferably contains about 25 1.0 inch diameter holes 101 spaced 2 inches apart on centers.

When one wishes to use the plate of FIG. 9 as steel plate 100 (see FIG. 4), one may notch the corners of such plate with one inch notches (such as, e.g., notch 108). Otherwise, steel plate 100 may be substantially identical to steel plate 70.

Figure 10A:
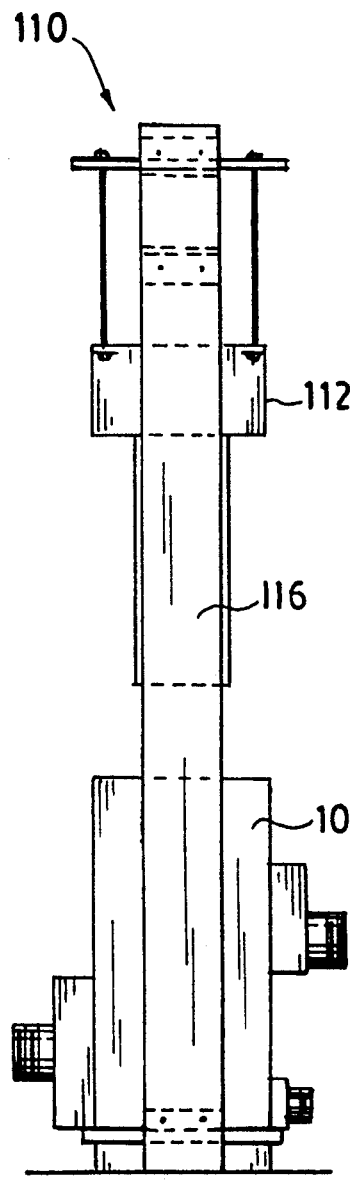
FIG. 10 is sectional view of a press which may be used the device of FIG. 1.
Figure 10B:
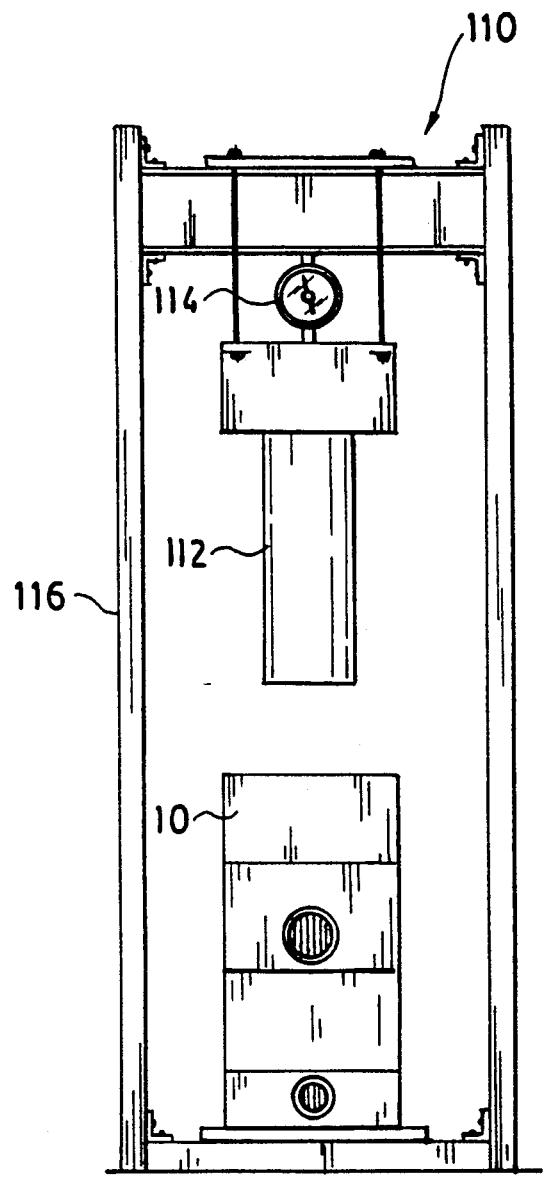

FIGS. 10A and 10B illustrate one preferred press which may be used to compress the bed of tire chips 74. Referring to these Figures, it will be seen that press 110 is comprised of tire chip cell 10, hydraulic cylinder 112, pressure gauge 114, and steel channel structural element 116.

Figure 11:
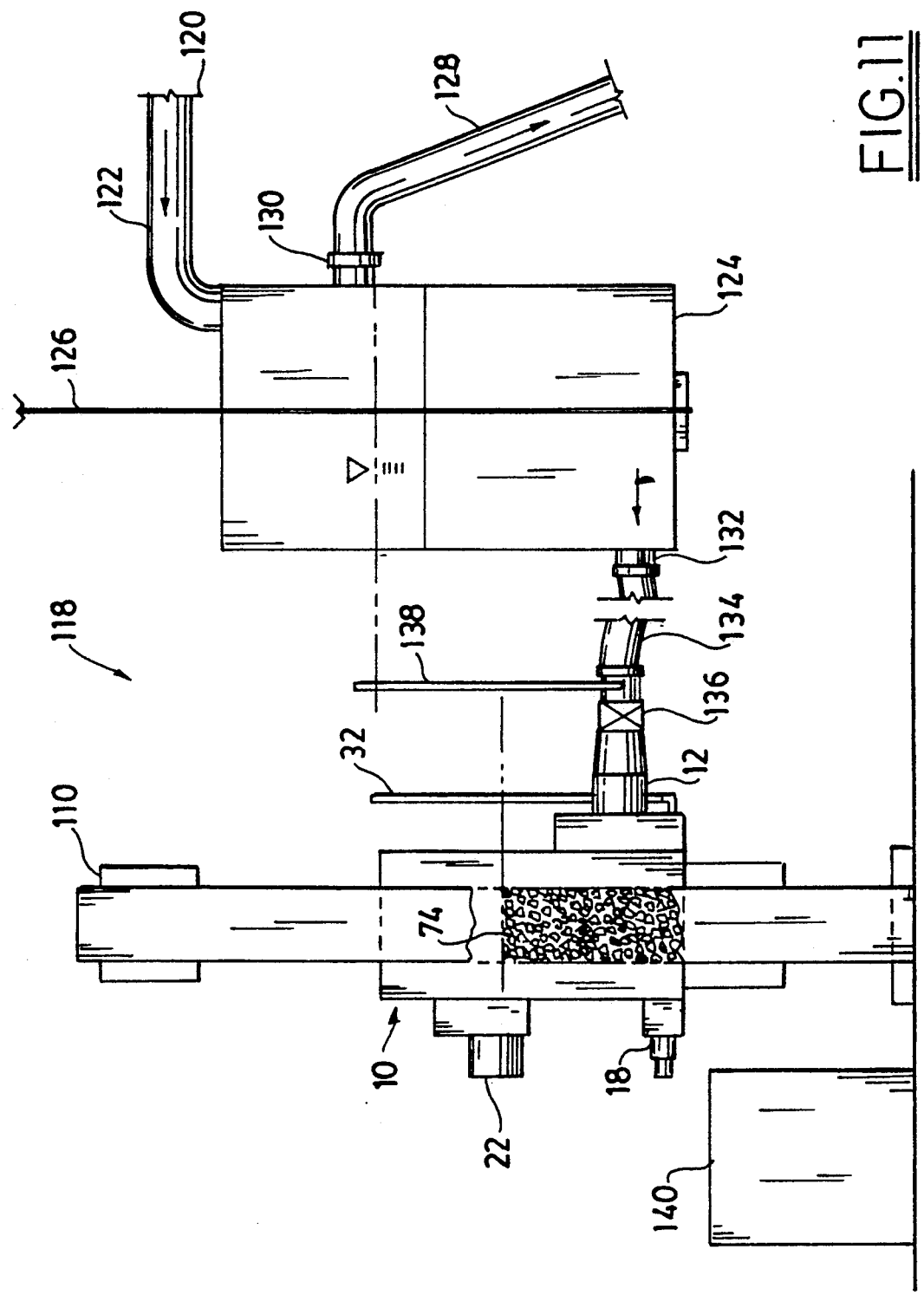
FIG. 11 is a schematic representation of a testing system which may be used in the process of the invention.

FIG. 11 is a schematic view of a testing apparatus which may be used in the process of the invention. Referring to FIG. 11, it will be seen that testing apparatus 118 is comprised of a means for supplying water 120 and the tire chip cell 10.

Referring to FIG. 11, it will be seen that means for supplying water 120 is comprised of a water inlet hose 122. It is preferred that water inlet hose 122 have a inner diameter of at least about 3 inches.

The water fed via inlet hose 122 is contained in vessel 124, where the head of the water and/or its pressure may be adjusted. It is preferred that vessel 124 have a capacity of at least about 55 gallons.

In one embodiment, illustrated in FIG. 11, a sling 126 is connected to vessel 124. As drum sling 126 is raised, vessel 124 also is raised, thereby affecting the potential energy (the "head") of the water in the vessel. As is known to those skilled in the art, the head ("H") of a hydraulic system is the energy (capacity to do work) possessed by a liquid because of its elevation, velocity, pressure, or any combination of these. Each source of energy may be expressed in terms of equivalent head in feet, inches of water, or pounds per square inch; and each can be converted into the other two. See, e.g., A.S.T.M. Standard D 2458.

Water supply means 120 also is preferably provided with an overflow hose 128 which is connected via fitting 130.

Water may flow from vessel 124 via outflow fitting 132, through flexible hose 134, and to valve 136, which controls the rate of flow of water to tire chip cell inlet 12. The height of the water inside vessel 124 may be monitored by reference to transparent tube 138, which is connected to valve 136.

The configuration depicted in FIG. 11 allows one to conduct a vertical permeability test (also see FIG. 5) of the tire chips; and the device depicted in FIG. 11 is similar to that depicted in FIG. 5.

Referring again to FIG. 11, it will be seen that the tire chip cell 10 is comprised of a outflow container which is operatively connected to cell 10. In the embodiment illustrated in FIG. 11, water existing outlet 22 will fall into container 140.

It will be apparent to those skilled in the art that the device depicted in FIGS. 1 through 11 is but one of several means which can be used to evaluate the suitability of a particular tire chip composition for use in a particular landfill. What each of these devices has in common, however, are the following features: (1) a vessel comprised of one fluid inlet, a first fluid outlet, and second fluid outlet; (2) means for providing liquid (such as water or leachate) to said fluid inlet; (3) means for varying the head of said fluid provided to said fluid inlet; (4) means for disposing a bed of tire chip material within said vessel; (5) means for compressing said bed of tire chip material; (6) means for varying the compression of said bed of tire chip material; (7) means for passing water substantially horizontally through said bed of tire chip material; (8) means for passing water substantially vertically through said tire chip material; (9) and means for determining the flow rate of fluid passing through said bed of tire chip material.

Testing elastomeric chip material

In the process of applicants' invention, it is preferred to use a shredded elastomeric product with a nominal size of 2.0 inches or smaller. As is known to those skilled in the art, a product with a 2.0 inch nominal size will have at least about 80 percent of its particles pass through a sieve with a 2 inch opening.

In one preferred embodiment, at least 50 weight percent of the shredded elastomeric particles have a maximum dimension between about 1 inch and 2 inches.

It is preferred that shredded elastomeric material be used which, when contacted with the leachate produced by a particular landfill site, will retain substantially all of its mechanical properties.

As is known to those skilled in the art, most landfills are provided with means for collecting the leachate produced by the landfill. The leachate can then be used in accelerated aging test with the shredded elastomeric material.

The accelerated aging tests may be conducted in accordance with Environmental Protection Agency test 9090, in which the elastomer chips are submerged in leachate for at least about a specified period of time and then tested. By way of illustration and not limitation, in one such test tanks containing leachate were maintained at a temperature of either 23 or 55 degrees centigrade, and each tank was charged with six tire chips; two control tanks, one of which was at 23 degrees centigrade, and the other of which was at 55 degrees centigrade, were filled with distilled water and each charged with six tire chips.

In this test, prior to placement within the tanks, each of the test chips was tested for gauge thickness at full corners of specimens, length and width (measured along all edges and centerline of the specimens), mass and volume (measured in accordance with A.S.T.M. Standard Test D471-79), and hardness (as measured in accordance with A.S.T.M. Standard Test D2240-86.

At the end of 30, 60, 90, and 120 days of exposure, each tire chip is removed from the tank for measurements.

It is preferred that the shredded elastomeric material used in the process have a hardness after 120 days under the accelerated aging conditions used at least equal to the hardness of the control samples at time zero.

It is important that the shredded tire material used in applicants' process have a permeability after it has been contacted with leachate from the landfill of at least about $1 \times 10^{-3}$ centimeters per second and, preferably, a permeability after such aging of at least $1 \times 10^{-1}$ centimeters per second. The shredded tire material is preferably tested after it has been submerged in leachate at a temperature of 55 degrees centigrade for 120 days.

The shredded tire chips which have been submerged in leachate at a temperature of 55 degrees centigrade may be charged to the apparatus of FIG. 4 and subjected to a load of from about 2,500 pounds per square foot to about 25,000 pounds per square foot. Thereafter, the compressed shredded elastomeric material is preferably subjected to a horizontal permeability test, in which water (or other fluid) is horizontally passed through the compressed tire chips.

The fluid used in the horizontal permeability test is preferably water. However, one could also use leachate, a fluid with a viscosity similar to that of leachate, and the like.

The horizontal permeability test is performed with fluid with a head that corresponds to the head of the leachate in the landfill. In general, the fluid used in the test has a hydraulic gradient of from about 0.06 to about 2.2 and, preferably, from about 0.1 to about 1.6. As is known to those skilled in the art, the hydraulic gradient is the loss of hydraulic head per unit distance of flow; and it may be determined in accordance with A.S.T.M. D 2458.

The flow rate of the fluid passing through the bed 74 of tire chips is measured. Thus, referring to FIG. 11, the volume of water deposited in vessel 140 per unit period of time allows one to compute the permeability of the tire chip material. The permeability, also referred to as the "coefficient of permeability," may be calculated in accordance with the formula: $k = q/iA$, wherein (1) k is the coefficient of permeability (in centimeters per second), (2) q is the rate of flow through the tire chips (in gallons per minute), (3) i is the hydraulic gradient, and (4) A is the cross-sectional area of the bed of tire chips perpendicular to flow.

It is preferred that the horizontal permeability of the tire chips, after being aged with leachate for at least 120 days, is at least about 90 percent as great as the horizontal permeability of the tire chips prior to time such chips have been aged with leachate.

Preparation of a landfill

After a candidate shredded elastomeric material has been demonstrated to be suitable for a particular landfill, then it may be incorporated into such landfill in accordance with the process described below.

Applicants' process may be used with broad variety of landfills. Thus, by way of illustration and not limitation, one may use the process with the landfills described in U.S. Pat. Nos. 4,908,129, 4,902,167, 4,838,733, 4,810,131, 4,762,623, 4,696,599, and the like. The disclosure of each of these United States patent is hereby incorporated by reference into this specification.

Figure 12:
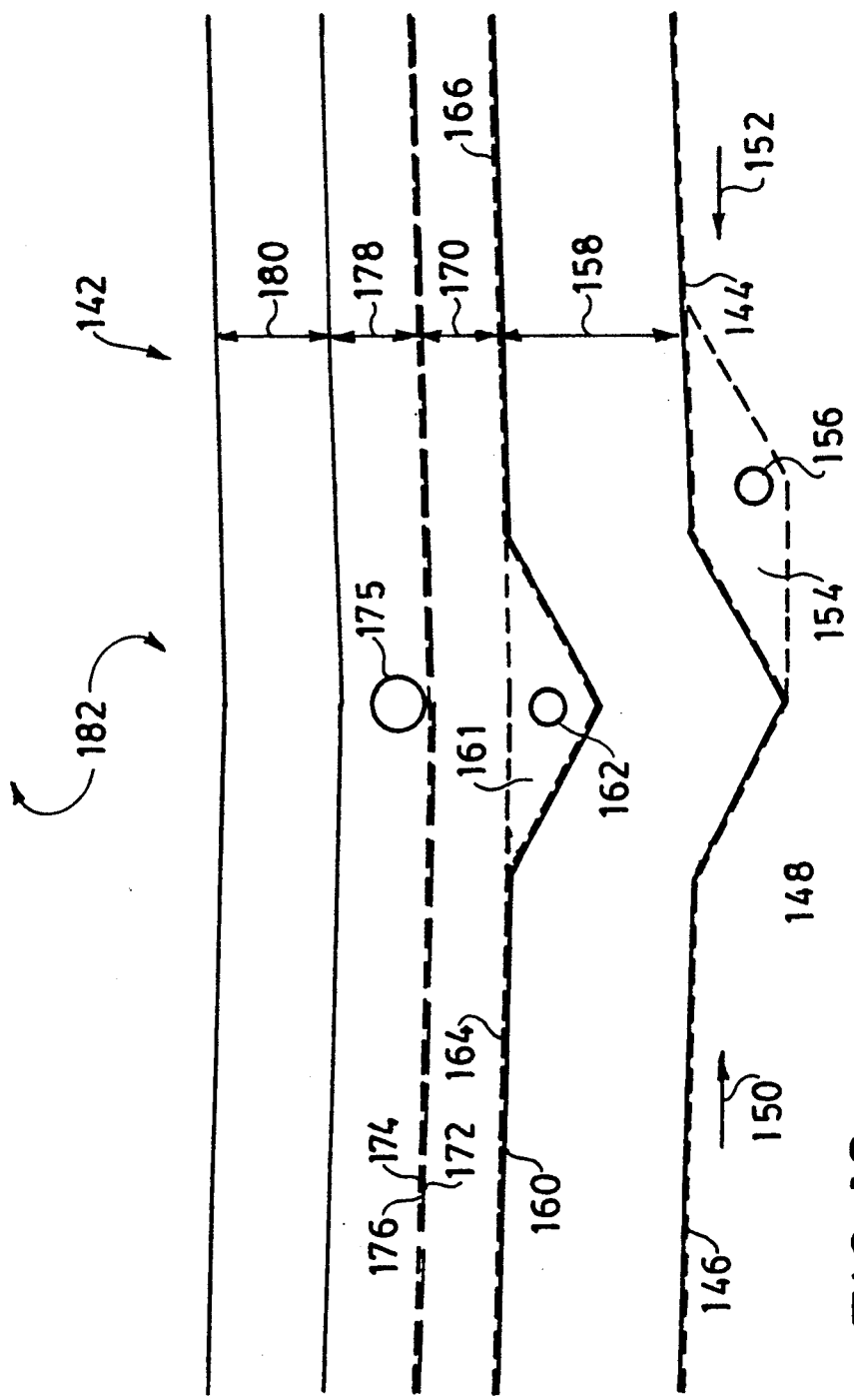
FIG. 12 illustrates a typical landfill which may be produced by the process of this invention.

One preferred landfill which may be produced in accordance with applicants' process is illustrated in FIG. 12. Referring to FIG. 12, landfill 142 may be produced by excavating down to a level which is preferably above the bedrock and the ground water table. Thus, as illustrated in FIG. 12, and in the embodiment illustrated therein, the limit of excavation is level 144. As is apparent to those skilled in the art, the limit of excavation in any particular case will vary with the geological conditions and the State regulations.

Referring again to FIG. 12, and in the embodiment illustrated therein, the surface of the limit of excavation 144 is preferably covered with a geocomposite porewater material 146 which is designed to prevent pore water from the ground beneath such material from seeping into the landfill.

Any geocomposite porewater material which will tend to prevent the migration of water through it may be used as material 146. Thus, by way of illustration, one may use a composite material containing a layer of cloth and a layer of high density polyethylene in the form of a porous net, such as "geonet", Referring again to FIG. 12, the water which tends to seep up from ground will be conveyed in the direction of arrows 150 and 152 and will tend to collect in area 154. Area 154 preferably is packed with a porous material, such as stone (New York State D.O.T. #1 or equivalent stone) and will tend to be collected by lateral porewater drain 156. The lateral porewater drain pipe preferably is a slotted polyvinyl chloride drain which allows the water to be collected therein and transports it away.

Above the porewater material 146 is located a layer of soil 158 with a permeability of no greater than $1\times10^{-7}$ centimeters per second. This substantially impermeable soil layer acts as second barrier to the passage of fluid. In general, layer 158 is at least about 24 inches thick.

Above the substantially impervious soil layer 158 is located an impervious synthetic material 160, such as, e.g., high density polyethylene. Thus, one may use high-density polyethylene with a thickness of about 80 mils. In addition, one may optionally use on top of the synthetic material 160 one or more layers of geonet (a plastic net material which is inert to the leachate but which tends to convey the leachate towards the collection drain.

Referring again to FIG. 12, it will be seen that sections 164 and 166 are higher than collection drain area 168; and, thus, fluid tends to flow into area 168.

Area 168 preferably is filled with stone, such as New York State D.O.T. #1 stone. It also contains collection drain 162 which, like drain 156, is a slotted polyvinylchloride lateral drain pipe.

Layer 170 is disposed above layer 158. This layer 170 is preferably a soil layer with a permeability of no greater than about $1\times10^{-5}$ centimeters per second. Layer 170 generally has a thickness of at least about 12 inches.

Disposed above layer 170 is fabric linear comprised of bentonite (or similar clay-like material). The bentonite fabric material is generally from about 0.1 to about 0.25 inches thick.

Disposed above the bentonite linear 172 is another layer of impervious plastic material 174, such as the 80 mil high density polyethylene described above. It is preferred that, in order to protect the plastic material 174 from stone, a layer 176 of geotextile fabric (such as polyester fabric) be disposed over the plastic material 174.

In the preferred embodiment illustrated in FIG. 12, another slotted polyvinylchloride lateral drain 175 is located above the geotextile fabric layer 176. Disposed above the geotextile fabric material 176 is a layer 178 of stone, such as New York State D.O.T. #2 Stone; and disposed above the stone layer 178 is a layer of tire chips 180. In general, the combined height of the layer 178 and the layer 180 is preferably from about 24 to about 32 inches, it being recognized that smaller and larger layers also may be used.

In one embodiment, layer 178 is from about 12 to about 24 inches, and layer 180 is from about 12 to about 30 inches. In general, the width of the tire chip layer is at least about 1.1 times as great as the width of the stone.

Disposed above the tire chip layer 180 is the waste material 182. In general, the waste layer may range from about 40 to about 500 feet.

Any of the waste materials known to those skilled in the art may be used in the waste layer 182. Thus, by means of illustration and not limitation, one may use the municipal waste material(s) described in U.S. Pat. No. 4,971,616, the disclosure of which is hereby incorporated by reference into this specification. Essentially, any municipal and/or industrial waste may be used in the landfill.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

We claim:

1. A process for producing a landfill from a specified landfill site, comprising the steps of:
   (a) collecting leachate from said specified landfill site;
   (b) providing a shredded material, wherein said shredded material is comprised of a material selected from the group consisting of natural rubber material, synthetic rubber material, and mixtures thereof;
   (c) dividing said shredded material into a first portion and a second portion;
   (d) contacting said first portion of said shredded material with said leachate, thereby providing an aged shredded material;
   (e) determining the horizontal permeability of a bed of said aged shredded material in a permeability tester, wherein:
      1. during said test, said bed of aged shredded material is subjected to a compressive force of from about 2,500 to about 25,000 pounds per square foot while liquid with a hydraulic gradient of from about 0.06 to about 2.2 is horizontally passed through said bed; and
      2. said permeability tester is comprised of:
         (a) a vessel comprised of one fluid inlet, a first fluid outlet, and a second fluid outlet;
         (b) means for providing fluid to said fluid inlet;
         (c) means for varying the head of said fluid provided to said fluid inlet;
         (d) means for disposing a bed of said shredded material within said vessel;
         (e) means for compressing said bed of shredded material;
         (f) means for varying the compression of said bed of shredded material;
         (g) means for passing fluid substantially horizontally through said bed of shredded material; and
         (h) means for determining the flow rate of fluid passing through said bed of shredded material;
   (f) depositing in a landfill a layer of said second portion of said shredded material which is from about 12 to about 30 inches deep, provided that said aged shredded material has a horizontal permeability which is at least about $1\times10^{-}$ centimeters per second and is at least about 0.9 times as great as the horizontal permeability of said second portion of said shredded material prior to the time it has been contacted with said leachate; and (g) depositing a layer of waste material on top of said layer of said second portion of said shredded material.

2. The process as recited in claim 1, wherein said permeability tester is comprised of means for passing fluid substantially vertically through said bed of shredded material.

3. The process as recited in claim 1, wherein said shredded material has a nominal size of about 2.0 inches.

4. The process as recited in claim 1, wherein at least about 50 percent of the particles of said shredded material have a maximum dimension of from about 1 to about 2 inches.

5. The process as recited in claim 1, wherein said fluid is water.

6. The process as recited in claim 1, wherein the hardness of said aged shredded material is at least about as great as the hardness of unaged shredded material.

7. The process as recited in claim 1, wherein said shredded material is contacted with said leachate for at least about 120 days.

8. The process as recited in claim 7, wherein said shredded material is contacted with leachate maintained at a temperature of at least about 55 degrees centigrade.

9. The process as recited in claim 1, wherein said shredded material is deposited over a layer of stone in said landfill.

10. The process as recited in claim 9, wherein said layer of stone is from about 12 to about 24 inches thick.

11. The process as recited in claim 1, wherein said layer of shredded material is at least about 1.1 times as thick as said layer of stone.

* * * * *